United States Patent
Kumar et al.

(12) 
(10) Patent No.: US 10,588,136 B2
(45) Date of Patent: Mar. 10, 2020

(54) RESTRICT THE POSITIONING REFERENCE SIGNAL BANDWIDTH IN NB-IOT TO SAVE POWER

(71) Applicant: QUALCOMM Incorporated, San Diego, CA (US)

(72) Inventors: Mukesh Kumar, Hyderabad (IN); Guttorm Ringstad Opshaug, Redwood City, CA (US); Priyangshu Ghosh, Kolkata (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/990,452

(22) Filed: May 25, 2018

(65) Prior Publication Data

US 2019/0364570 A1 Nov. 28, 2019

(51) Int. Cl.
| | |
|---|---|
| *H04W 72/08* | (2009.01) |
| *H04B 17/336* | (2015.01) |
| *H04L 5/00* | (2006.01) |
| *H04W 72/04* | (2009.01) |

(52) U.S. Cl.
CPC ........ *H04W 72/082* (2013.01); *H04B 17/336* (2015.01); *H04L 5/0053* (2013.01); *H04W 72/048* (2013.01)

(58) Field of Classification Search
None
See application file for complete search history.

(56) References Cited

U.S. PATENT DOCUMENTS

| | | | |
|---|---|---|---|
| 9,485,745 B2 | 11/2016 | Kurby et al. | |
| 9,572,127 B2 | 2/2017 | Xiao et al. | |
| 9,733,337 B2 | 8/2017 | Edge et al. | |
| 9,739,869 B2 | 8/2017 | Tee et al. | |
| 2008/0268857 A1 | 10/2008 | McCoy et al. | |

(Continued)

OTHER PUBLICATIONS

Ericsson: "Discussions on gap sharing for RSTD measurement for feMTC", 3GPP Draft; R4-1705074, 3rd Generation Partnership Project (3GPP), Mobile Competence Centre ; 650, Route Des Lucioles ; F-06921 Sophia-Antipolis Cedex ; France, vol. RAN WG4, No. Hangzhou, China; May 15, 2015-May 19, 2015, May 14, 2017 (May 14, 2017), XP051277229, 4 Pages, Retrieved from the Internet: URL:http://www.3gpp.org/ftp/Meetings_3GPP_SYNC/RAN4/Docs/ [retrieved on May 14, 2017].

(Continued)

*Primary Examiner* — Kodzovi Acolatse
(74) *Attorney, Agent, or Firm* — Kilpatrick Townsend & Stockton, LLP

(57) ABSTRACT

Aspects of the disclosure are related to a method, apparatus and system for adjusting a processing bandwidth or frequency domain buffer decimation associated with reference signals, for example, positioning reference signals (PRS). By reducing the number of, for example, resource blocks and/or resource elements to be processed, the power involved in processing the reference signal can be reduced. Hence, in some implementations, aspects of the disclosure can enable low-power low-bandwidth devices, such as NarrowBand Internet of Things (IoT) (NBIoT), to decode reference signals such as PRS.

29 Claims, 8 Drawing Sheets

(56) References Cited

U.S. PATENT DOCUMENTS

| | | | |
|---|---|---|---|
| 2015/0119066 A1* | 4/2015 | Chiou | H04L 29/08657 455/456.1 |
| 2016/0291128 A1* | 10/2016 | Persson | G01S 5/10 |
| 2016/0295374 A1* | 10/2016 | Persson | G01S 5/0036 |
| 2018/0020423 A1 | 1/2018 | Wang et al. | |
| 2018/0048444 A1* | 2/2018 | Park | H04L 5/005 |
| 2018/0098314 A1* | 4/2018 | Rico Alvarino | H04W 4/70 |
| 2018/0139763 A1* | 5/2018 | Bitra | H04L 5/0048 |
| 2018/0284289 A1* | 10/2018 | Lee | G01S 19/30 |
| 2018/0287751 A1* | 10/2018 | Lim | H04L 5/006 |
| 2019/0141612 A1* | 5/2019 | Takeda | H04B 7/063 |

OTHER PUBLICATIONS

International Search Report and Written Opinion—PCT/US2019/032116—ISA/EPO—Aug. 5, 2019.

Qualcomm Incorporated: "Autonomous gap for RSTD measurement for eMTC/FeMTC UEs", 3GPP Draft; R4-1710442 FEMTC RSTD With Autonomous Gap V1, 3rd Generation Partnership Project (3GPP), Mobile Competence Centre ; 650, Route Des Lucioles ; F-06921 Sophia-Antipolis Cedex ; France, vol. RAN WG4, No. Dubrovnik, Croatia; Oct. 9, 2017-Oct. 13, 2017, Oct. 8, 2017 (Oct. 8, 2017), XP051345291, 3 Pages, Retrieved from the Internet: URL:http://www.3gpp.org/ftp/Meetings_3GPP_SYNC/RAN4/Docs/ [retrieved on Oct. 8, 2017].

Qualcomm Incorporated: "Some open issues in OTDOA for eMTC and FeMTC UEs", 3GPP Draft; R4-1708435-Open-Issues-In-RSTD, 3rd Generation Partnership Project (3GPP), Mobile Competence Centre ; 650, Route Des Lucioles ; F-06921 Sophia-Antipolis Cedex; France, vol. RAN WG4, No. Berlin, Germany; Aug. 21, 2017-Aug. 25, 2017, Aug. 20, 2017 (Aug. 20, 2017), XP051321560, 4 Pages, Retrieved from the Internet: URL:http://www.3gpp.org/ftp/Meetings_3GPP_SYNC/RAN4/Docs/ [retrieved on Aug. 20, 2017].

* cited by examiner

RESTRICT THE POSITIONING REFERENCE SIGNAL BANDWIDTH IN NB-IOT TO SAVE POWER

FIELD

Embodiments of the disclosure relate to electronic devices, and more particularly, to reducing the processing bandwidth of positioning reference signals.

BACKGROUND

To locate a User Equipment (UE) geographically, there are several approaches. One is to use some form of terrestrial radio location based on measurements made by a UE of signals transmitted by wireless network base stations and access points and/or based on measurements made by network elements (e.g. base stations and access points (APs)) of signals transmitted by the UE. Terrestrial radio location in a cellular telephony system may use measurements made by a UE of transmission timing differences between pairs of base stations or APs and may employ trilateration or multilateration techniques to determine the position of the UE based on two, or more commonly three or more, timing difference measurements. One such terrestrial radio location method that is applicable to measurements of Long-Term Evolution (LTE) base stations (referred to as eNodeBs or eNBs) and that is standardized by 3rd Generation Partnership Project (3GPP) in 3GPP Technical Specifications (TSs) 36.211, 36.214, 36.305, 36.355 and 36.455 is Observed Time Difference of Arrival (OTDOA). OTDOA is a multilateration method in which the UE measures the time difference between specific signals, which may be positioning reference signals (PRS), from pairs of eNodeBs and either computes a location itself from these measurements or reports the measured time differences (known as reference signal time differences (RSTDs), to an Enhanced Serving Mobile Location Center (E-SMLC) or to a Secure User Plane Location (SUPL) Location Platform (SLP) which then computes the UE location. In either case, the measured time differences and knowledge of the eNodeBs' locations and relative (or synchronized) transmission timing are used to calculate the UE's position.

To decode the conventional PRS with bandwidths of 20 MHz or 10 MHz at their full bandwidth with certain low-power low-bandwidth devices, such as NarrowBand Internet of Things (IoT) (NBIoT) devices with a 180 kHz bandwidth, or LTE Cat-M devices with a 1.4 MHz bandwidth, etc., may use processing bandwidths that use higher than desirable power for such devices. Increasing the processing bandwidth of such devices may be undesirable for at least cost and power consumption reasons.

DETAILED DESCRIPTION

Figure 1:
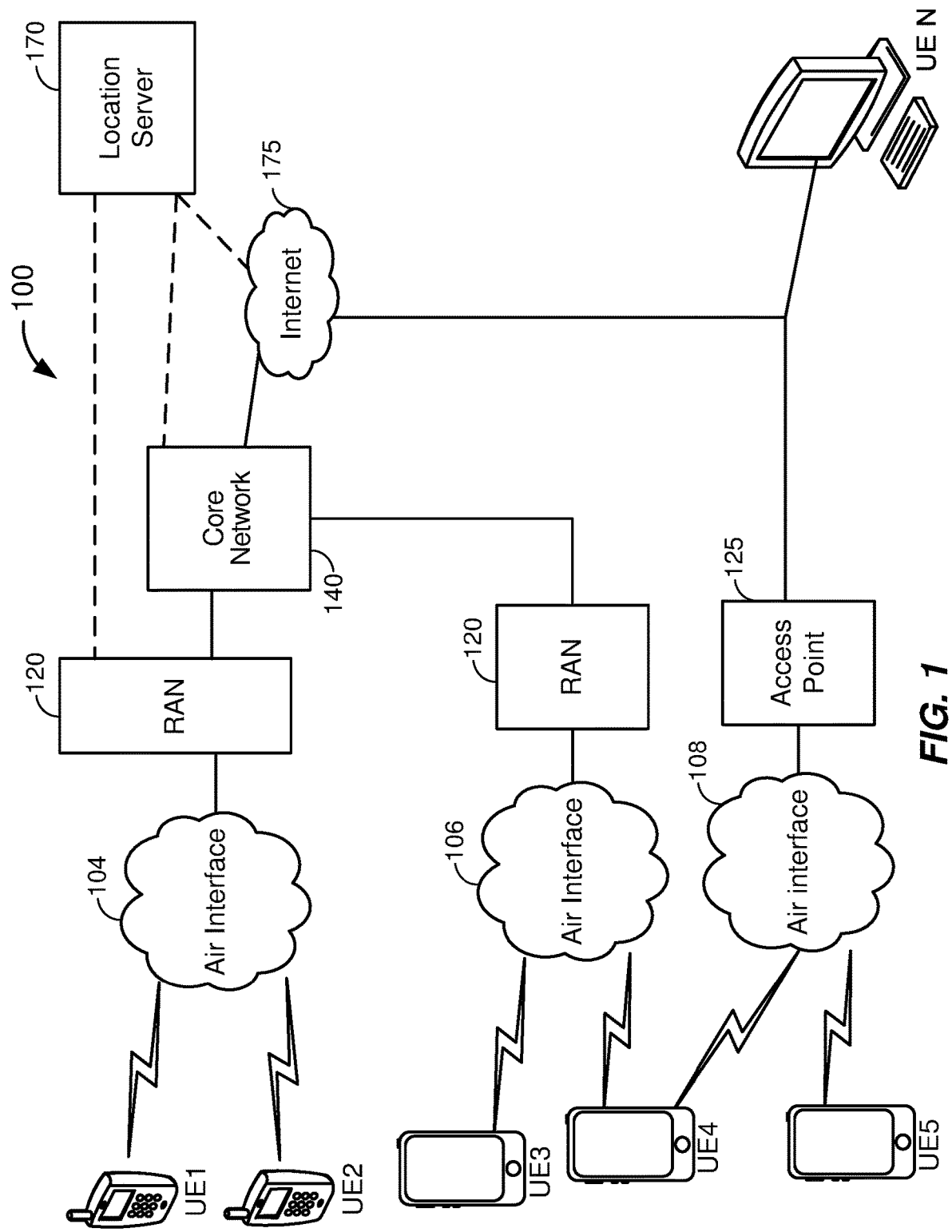
FIG. 1 illustrates a high-level system architecture of a wireless communications system in accordance with an aspect of the disclosure.

Aspects of the disclosure are disclosed in the following description and related drawings directed to specific aspects of the disclosure. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary", an "example", "illustrative", "illustrating" or an "illustration" is not necessarily to be construed as preferred or advantageous over other aspects. Likewise, the term "aspects of the disclosure" does not require that all aspects of the disclosure include the discussed feature, advantage or mode of operation.

Further, many aspects are described in terms of sequences of actions to be performed by, for example, elements of a computing device. Various actions described herein can be performed by specific circuits (e.g., application specific integrated circuits (ASICs)), by program instructions being executed (either directly or after compiling) by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

In one example, a method implemented at a user equipment (UE) for adjusting a processing bandwidth or a frequency domain (FD) buffer decimation associated with a reference signal can include determining a present Carrier-to-Interference-and-Noise Ratio (CINR) associated with the reference signal; determining whether the present CINR associated with the reference signal is greater than an upper reference signal CINR threshold; and reducing the processing bandwidth associated with the reference signal, or increasing the FD buffer decimation associated with the reference signal, in response to determining that the present CINR associated with the reference signal is greater than the upper reference signal CINR threshold. In another example, an apparatus configured to adjust a processing bandwidth or a frequency domain (FD) buffer decimation associated with a reference signal can include a memory and a processor coupled to the memory. The processor can be configured to determine a present Carrier-to-Interference-and-Noise Ratio (CINR) associated with the reference signal; determine whether the present CINR associated with the reference signal is greater than an upper reference signal CINR threshold; and reduce the processing bandwidth associated with the reference signal, or increase the FD buffer decimation associated with the reference signal, in response to determining that the present CINR associated with the reference signal is greater than the upper reference signal CINR threshold. In another example, an apparatus for adjusting a processing bandwidth or a frequency domain (FD) buffer decimation associated with a reference signal can include means for determining a present Carrier-to-Interference-and-Noise Ratio (CINR) associated with the reference signal; means for determining whether the present CINR associated with the reference signal is greater than an upper reference signal CINR threshold; and means for reducing the processing bandwidth associated with the reference signal, or increasing the FD buffer decimation associated with the reference signal, in response to determining that the present CINR associated with the reference signal is greater than the upper reference signal CINR threshold. In another example, a non-transitory computer-readable medium can comprise code which, when executed by a processor, instructs the processor to perform a procedure implemented at a User Equipment (UE). The procedure can adjust a processing bandwidth or a frequency domain (FD) buffer decimation associated with a reference signal. The procedure can include determining a present Carrier-to-Interference-and-Noise Ratio (CINR) associated with the reference signal; determining whether the present CINR associated with the reference signal is greater than an upper reference signal CINR threshold; and reducing the processing bandwidth associated with the reference signal, or increasing the FD buffer decimation associated with the reference signal, in response to determining that the present CINR associated with the reference signal is greater than the upper reference signal CINR threshold.

A client device, referred to herein as a User Equipment (UE), may be mobile or stationary, and may communicate with a radio access network (RAN). As used herein, the term "UE" may be referred to interchangeably as an "access terminal" or "AT", a "wireless device", a "subscriber device", a "mobile device", a "subscriber terminal", a "subscriber station", a "user terminal" or UT, a "mobile terminal", a "mobile station", a SUPL enabled terminal (SET), a target, a target device, a target UE, and variations thereof. A UE may be a cell phone, smart phone, laptop, tablet, asset tag, personal digital assistant (PDA) or any other device that is enabled to communicate wirelessly with other UEs and/or other entities via direct means and/or via one or more networks or one or more network elements. Generally, UEs can communicate with a core network via the RAN, and through the core network (or sometimes through the RAN) the UEs can be connected with external networks such as the Internet. The RAN may support wireless communication from UEs using cellular based radio technologies such as GSM, Universal Mobile Telecommunications System (UMTS) and LTE as defined by 3GPP or Code Division Multiple Access 2000 (CDMA2000) as defined by the 3rd Generation Partnership Project 2 (3GPP2). A UE may employ other mechanisms of connecting to the core network and/or the Internet such as over wired access networks, WiFi networks (e.g., based on Institute of Electrical and Electronics Engineers (IEEE) 802.11, etc.), Bluetooth networks and so on. UEs can be embodied by any of a number of types of devices including but not limited to printed circuit cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an aspect of the disclosure. The wireless communications system 100 contains a number N of UEs labelled UE 1, UE 2 . . . UE N and referred to as UEs UE 1 . . . UE N. The UEs UE 1 . . . UE N can include cellular telephones, PDA, smartphones, pagers, a laptop computer, a desktop computer, and so on, although more generally UEs can include any other device that is enabled to communicate wirelessly with other UEs and/or other entities directly or by means of one or more networks, for example one or more LTE networks, or one or more network elements including. For example, in FIG. 1, UE 1 and UE 2 are illustrated as cellular calling phones, UE 3, UE 4, and UE 5 are illustrated as cellular touchscreen phones or smart phones, and UE N is illustrated as a desktop computer or personal computer (PC).

Referring to FIG. 1, UEs UE 1 . . . UE N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., Code Division Multiple Access (CDMA), Enhanced Voice Data Optimized (EVDO), Enhanced High Rate Packet Data (eHRPD), GSM, EDGE, Wideband CDMA (WCDMA), LTE, LTE-U, etc.), while the air interface 108 can comply with a wireless local area network (WLAN) protocol (e.g., IEEE 802.11 or Bluetooth). The RAN 120 (shown in FIG. 1 as comprising two separate portions associated with air interfaces 104 and 106, respectively) includes a plurality of access points that serve UEs over air interfaces, such as the air interfaces 104 and 106. The access points in the RAN 120 can be referred to as access nodes or ANs, access points or APs, base stations or BSs, Node Bs, eNodeBs, and so on. These access points can be terrestrial access points (or ground stations), or satellite access points. The RAN 120 is configured to connect to a core network 140 (such as an LTE core network) that can perform a variety of functions, including connecting circuit switched (CS) calls and/or packet switched (PS) connections between UEs served by the RAN 120 and other UEs served by the RAN 120 or a different RAN altogether, and can also mediate an exchange of PS data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to connect PS data communications between UE N and UEs UE 1 . . . UE N−1 via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example.

Referring to FIG. 1, a location server 170 is shown as connected to the Internet 175, the core network 140 or the RAN 120 or to any two or all three of these. The location server 170 can be implemented as a plurality of structurally separate servers, or alternately may correspond to a single server. As will be described below in more detail, the location server 170 may be configured to support one or more positioning services for UEs that can communicate with the location server 170 via the RAN 120, the core network 140 and/or the Internet 175.

Figure 2:
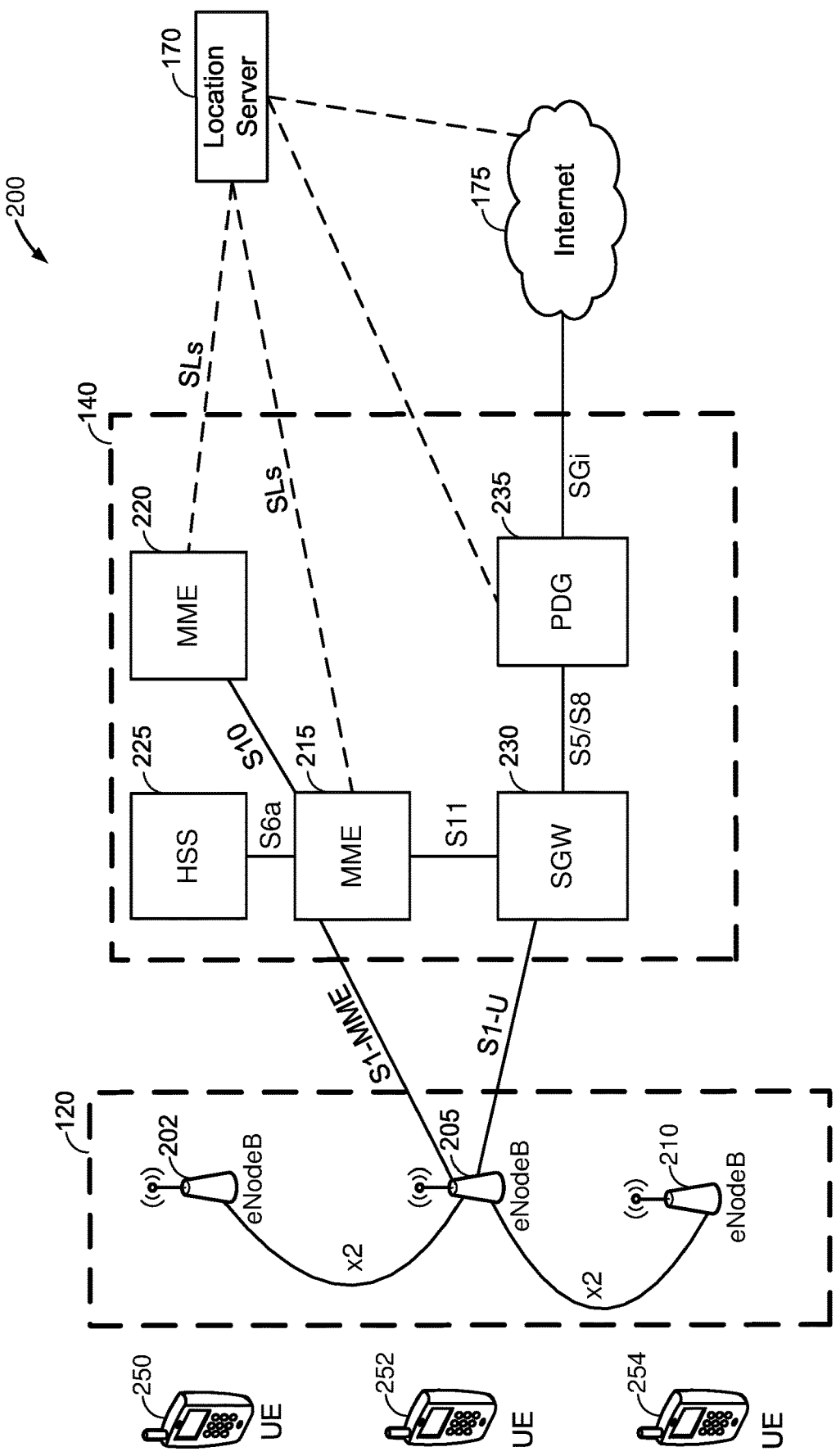
FIG. 2 illustrates an example configuration of a radio access network (RAN) and a packet-switched portion of the core network that is based on an Evolved Packet System (EPS) or Long-Term Evolution (LTE) network in accordance with an aspect of the disclosure.

FIG. 2 illustrates an example architecture 200 that is a configuration of the RAN 120 and a packet-switched portion of the core network 140 based on an Evolved Packet System (EPS) or LTE network, in accordance with an aspect of the disclosure. In one aspect, the communications system of FIG. 2 can be an implementation of the communications system of FIG. 1. Referring to FIG. 2, the RAN 120 in the EPS/LTE network is configured with a plurality of Evolved Node Bs (eNodeBs or eNBs) 202, 205 and 210. In FIG. 2, the core network 140 includes a plurality of Mobility Management Entities (MMEs) 215 and 220, a Home Subscriber Server (HSS) 225, a Serving Gateway (SGW) 230 and a Packet Data Network Gateway (PDG) 235. Network interfaces between these components, the RAN 120, the location server 170 and the Internet 175 are illustrated in FIG. 2 (S1-MME, S1-U, S5, S6a, S8, S10, S11, Sgi, SLs, and X2).

A high-level description of the components shown in FIG. 2 will now be described. However, these components are each well-known in the art from various 3GPP Technical Specifications (TSs), and the description contained herein is not intended to be an exhaustive description of all functionalities performed by these components.

Referring to FIG. 2, the eNBs 202, 205 and 210 are configured to provide LTE radio access to UEs (e.g. any of UEs 250, 252 and 254) and to provide signaling and voice/data connectivity between any UE and elements in core network 140 such as MME 215 and SGW 230. Although three UEs are shown in FIG. 2, there may be more of fewer UEs. The eNBs 202, 205 and 210 are configured to wirelessly communicate with the UEs 250, 252 and 254 via antennas. Each of the eNBs 202, 205 and 210 may provide communication coverage for a respective geographic area, e.g., a corresponding cell or several corresponding cells. The RAN 120 may include only macro base stations or it can have base stations of different types, e.g., macro base stations and femto base stations (also referred to as Home Evolved Node Bs (HeNBs), femto cells or as small cells). A macro base station may cover a relatively large geographic area (e.g., several kilometers in radius) and may allow unrestricted access by terminals with a service subscription. A femto base station may cover a relatively small geographic area (e.g., a home or office) and may in some cases allow restricted access by terminals having association with the femto cell (e.g., terminals for users in a home). The eNBs 202, 205 and 210, in turn, are configured to communicate with the core network 140 through one or more backhaul links between the eNBs 202, 205 and 210 and the core network 140. A backhaul link may be a wired or a wireless (e.g. a microwave) connection between an eNB and one or more components of the core network 140. Additionally or alternatively, a wireless backhaul link can be used, as described in further detail below.

The eNBs 202, 205 and 210 may be configured to broadcast a positioning reference signal (PRS) to nearby UEs to enable any UE to make measurements of PRS timing differences between pairs of eNBs and thereby enable a location estimate of the UE to be obtained by the UE itself or by a location server (e.g. location server 170) to which the timing difference measurements may be sent using OTDOA positioning. The term location estimate is used herein to refer to an estimate of a location for a UE (e.g. any of UEs 250, 252 and 254) which may be geographic (e.g. may comprise a latitude, longitude and possibly altitude) or may be civic (e.g. may comprise a street address, building designation or precise point or area within or nearby to a building or street address such as a particular entrance to a building, a particular room or suite in a building or a landmark such as a town square). A location estimate may also be referred to as a location, a position, a fix, a position fix, a location fix, a position estimate, a fix estimate or by some other term. The means of obtaining a location estimate may be referred to generically as positioning, locating or position fixing; a particular solution for obtaining a location estimate may be referred to as a location solution; and a particular method for obtaining a location estimate as part of a location solution may be referred to as a position method or location method.

Referring to FIG. 2, the MMEs 215 and 220 are configured to support network attachment of UEs (e.g. UEs 250, 252, 254), mobility of UEs and bearer assignment to UEs. MME functions include: Non-Access Stratum (NAS) signaling to UEs, NAS signaling security, mobility management for inter- and intra-technology handovers of UEs, PDG and SGW selection, and MME selection for UE handovers with MME change.

Referring to FIG. 2, the SGW 230 is the gateway that terminates the interface toward the RAN 120. For each UE attached to the core network 140 for an EPS-based system, at a given point of time, there may be a single SGW. The functions of the SGW 230 may include: mobility anchor point, packet routing and forwarding, and transport level packet marking in the uplink and the downlink (e.g. setting the DiffServ Code Point (DSCP) based on a QoS Class Identifier (QCI) of an associated EPS bearer).

Referring to FIG. 2, the PDG 235 is the gateway that terminates the SGi interface toward the Packet Data Network (PDN), e.g., the Internet 175. If a UE is accessing multiple PDNs, there may be more than one PDG for that UE. PDG functions may include: packet filtering (e.g. using deep packet inspection), UE Internet Protocol (IP) address allocation, transport level packet marking in the uplink and downlink (e.g. setting the DSCP based on the QCI of an associated EPS bearer), accounting for inter operator charging, uplink (UL) and downlink (DL) bearer binding, UL and DL rate enforcement and service level rate enforcement, and UL bearer binding. The PDG 235 may provide PDN connectivity to both GSM/EDGE Radio Access Network (GERAN)/Universal Terrestrial Radio Access Network (UTRAN) only UEs and E-UTRAN-capable UEs using any of E-UTRAN, GERAN, or UTRAN. The PDG 235 may provide PDN connectivity to E-UTRAN capable UEs using E-UTRAN only over the S5/S8 interface. The PDG 235 may provide IP connectivity to UEs 250, 252 and 254 by serving as the first entity on the network side with IP access and IP routing capability. As discussed later herein, the PDG 235 may also provide IP connectivity to an eNB beacon (e.g. to eNB 202, 205 or 210 when any of these eNBs function as an eNB beacon) in the case that the eNB beacon has a wireless backhaul connection.

In FIG. 2, the location server 170 is shown as connected to one or more of the Internet 175, the PDG 235, MME 220 and MME 215. The connections to MME 215 and MME 220 are applicable when location server 170 is or contains an E-SMLC. The connections to the Internet 175 and to the PDG 235 are applicable when location server 170 is or contains a SLP. Location server 170 may be used (i) to obtain a location for any of UEs 250, 252 and 254 (e.g. from signal measurements obtained and transferred to location server 170 by any of UEs 250, 252 and 254) and/or (ii) to provide assistance data to any of UEs 250, 252 and 254 to enable any of UEs 250, 252 and 254 to acquire and measure signals (e.g. signals from one or more of eNBs 202, 205 and 210) and/or, in some cases, compute a location from these signal measurements. Examples of assistance data can be information concerning downlink transmission from eNBs nearby to a UE (e.g. any of eNBs 202, 205 and 210) when OTDOA is used for positioning.

The core network 140, RAN 120 and location server 170 in FIG. 2 may correspond, respectively, to core network 140, RAN 120 and location server 170 in FIG. 1. In addition, UEs 250, 252 and 254 in FIG. 2 may each correspond to any of UEs 1 to N in FIG. 1.

As discussed above, to locate a UE geographically, there are several approaches one of which is the OTDOA positioning method, available in LTE. OTDOA is a multilateration method in which the UE measures the time difference between specific signals (e.g. PRS signals) from different pairs of eNodeBs and either reports these time differences to a location server, such as an E-SMLC or SLP, or computes a location itself from these time differences. The location computation can be based on the measured time differences and knowledge of the eNodeBs' locations and relative transmission timing (e.g., regarding whether eNBs are accurately synchronized or whether each eNB transmits with some known time difference relative to other eNBs). When a UE obtains a location estimate itself using OTDOA measured time differences, the additional data (e.g. eNodeBs' locations and relative transmission timing) may be provided to the UE by a location server (e.g. location server 170 in FIG. 2). In some implementations, a location estimate for a UE may be obtained (e.g. by the UE itself or by a location server) from OTDOA measured time differences and from other measurements made by the UE (e.g. measurements of signal timing from Global Positioning System (GPS) or other Global Navigation Satellite System (GNSS) satellites). In these implementations, known as hybrid positioning, the OTDOA measurements may contribute towards obtaining a UE location estimate but may not wholly determine the location estimate.

Figure 3A:
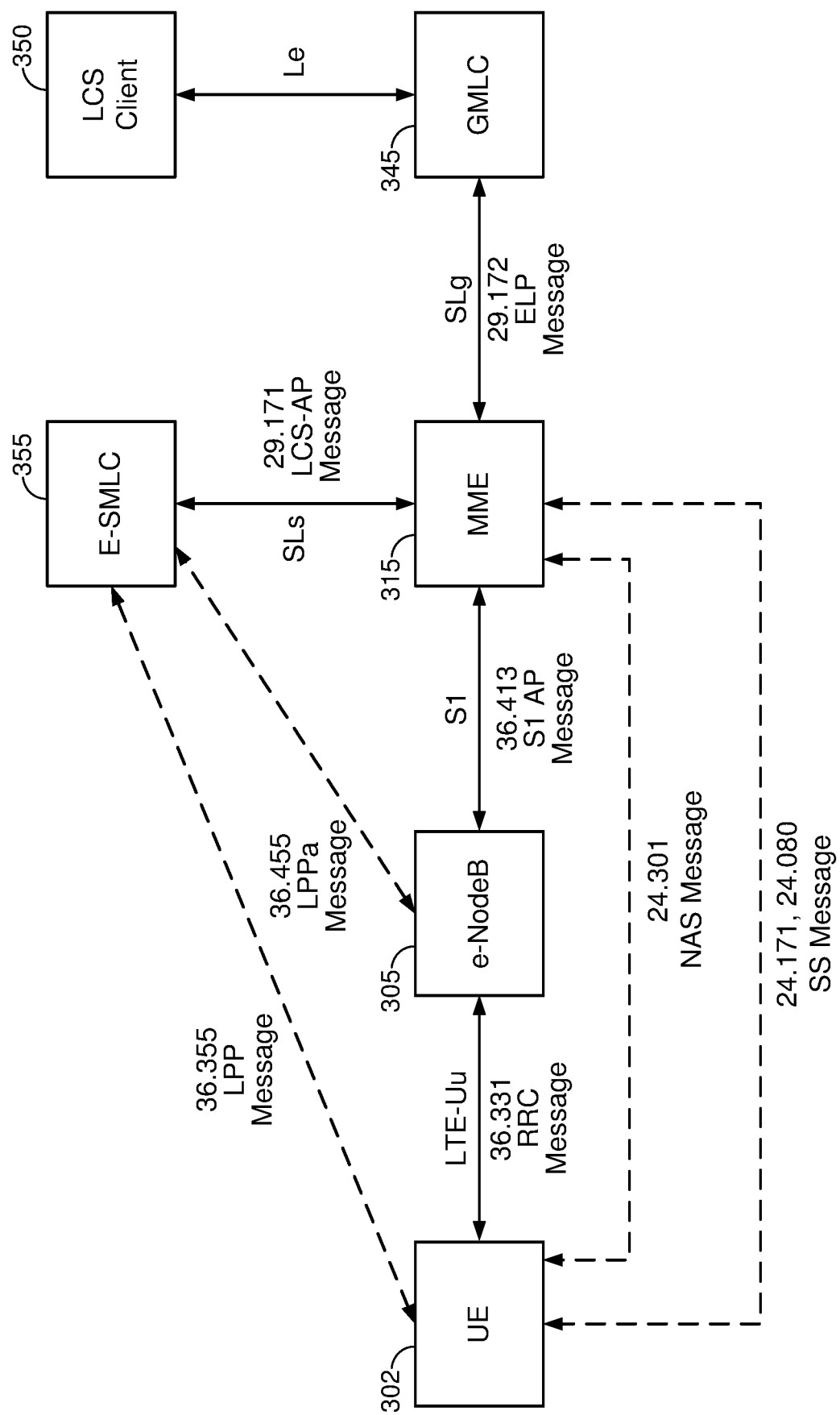
FIG. 3A illustrates exemplary control plane elements of the system architecture for network-assisted location service in the LTE network.

Referring to FIG. 3A, which as remarked shows network elements in an example LTE network that support control plane location, the dashed lines indicate protocols, associated message types and relevant 3GPP Technical Specifications (TSs) (referenced by TS number) for positioning interaction between pairs of entities that communicate with one another but are not directly connected to one another and the solid lines indicate protocols, message types, interface designations and relevant 3GPP TSs (referenced by TS number) for communication links used for positioning between directly connected communicating entities. For example, the E-SMLC 355 and the eNB 305 employ the LTE Positioning Protocol (LPP) A (LPPa) (shown as a dashed line in FIG. 3A) that is defined in 3GPP 36.455 and in which the E-SMLC 355 may request and obtain measurements made by eNB 305 of UE 302 by exchanging LPPa messages with eNB 305. The messages for the LPPa protocol are physically transferred over (i) the SLs interface (shown as a solid line in FIG. 3A) between the E-SMLC 355 and the MME 315 using the LCS-AP protocol defined in 3GPP TS 29.171 and (ii) over the S1 interface (also shown as a solid line in FIG. 3A) between the MME 315 and the eNB 305 using the S1 AP protocol defined in 3GPP TS 36.413. The MME 315 also communicates with the Gateway Mobile Location Center (GMLC) 345 over the SLg interface and the GMLC 345 communicates with an Location Services (LCS) client 350 over an Le interface.

Similarly, the E-SMLC 355 and UE 302 may employ the LPP (shown as a dashed line in FIG. 3A) that is defined in 3GPP TS 36.355 and in which the E-SMLC 355 may (i) request and obtain measurements (e.g., OTDOA measurements) made by UE 302 of signals transmitted by eNB 305 and other eNBs and/or (ii) provide assistance data to UE 302 (e.g., assistance data for OTDOA). Messages for the LPP protocol are physically transferred over the SLs interface between the E-SMLC 355 and the MME 315, over the S1 interface between the MME 315 and the eNB 305, and over the LTE Uu air interface between the eNB 305 and UE 302 (all shown as solid lines in FIG. 3B). In some implementations, an additional LPP Extensions (LPPe) message may be embedded inside an LPP message to provide information for additional position methods including extensions to OTDOA. The LPPe protocol is defined by Open Mobile Alliance (OMA) and when used in combination with LPP may be referred to as LPP/LPPe.

During an OTDOA positioning procedure, the E-SMLC 355 may request OTDOA measurements from the UE 302 through the LPP layer. The requested measurements may be a set of Reference Signal Time Difference (RSTD) measurements. Together with or prior to this request, the E-SMLC 355 may send the UE 302 assistance data, which may include a list of cells (such as a cell or cells corresponding to eNB 305) and parameters defining a Positioning Reference Signal (PRS) transmitted in each cell (by the eNB that supports the cell) to support OTDOA, including the bandwidth (BW), number of LTE subframes, periodicity, etc. for the PRS signal. The LPP request and assistance data applicable to OTDOA are described in more detail below.

UE 302 then obtains some or all of the requested OTDOA measurements during a given period of time. These measurements consist of measuring the exact time differences between the PRS signals received by UE 302 from different pairs of eNodeBs (or from different pairs of cells in the case that a common eNB supports two cells measured by UE 302). The UE 302 then reports these measured time differences to the E-SMLC 355 together with an estimate of the measurement quality for each measurement (e.g. which may be an estimate of the measurement error in each time difference measurement). Using these time difference estimates and the knowledge of the eNodeBs' positions and any transmit time offsets, the E-SMLC 355 estimates the position of the UE 302. In some implementations of OTDOA (e.g. when OTDOA is supported using LPP combined with LPPe), a UE 302 may not only make OTDOA time difference measurements but may also compute a location estimate from these measurements if E-SMLC 355 has provided LPP/LPPe assistance data to UE 302 comprising the eNodeB (e.g. eNB antenna) position for each cell and any transmit time offsets.

A similar procedure is possible for use of OTDOA when a SUPL user plane location solution is used instead of a control plane solution. In this case, an SLP and a UE (e.g., UE 302) exchange LPP messages (or combined LPP/LPPe messages) embedded inside SUPL messages (e.g., SUPL POS messages) that may be transferred between the SLP and UE using TCP/IP. The LPP (or LPP/LPPe) message exchange in the case of SUPL may be the same as or similar to the LPP (or LPP/LPP) message exchange in the case of a control plane solution (e.g., the same sequence of LPP or LPP/LPPe messages may be transferred) and only the method of transport may differ.

Figure 3B:
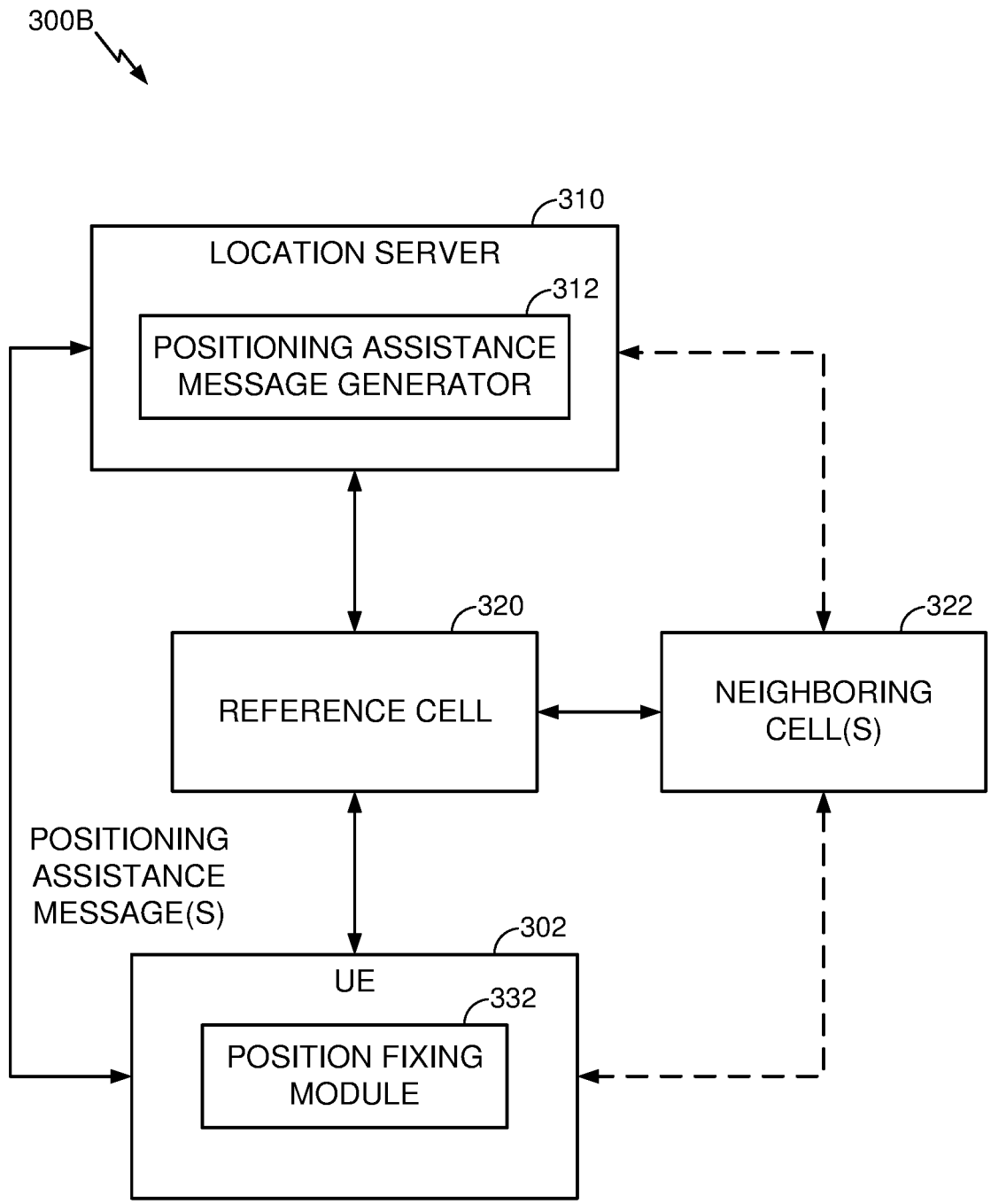
FIG. 3B illustrates an exemplary system for conducting network-assisted positioning using OTDOA.

FIG. 3B illustrates an exemplary system 300B for conducting network-assisted positioning using OTDOA. FIG. 3B may be applicable to fixed PRS signaling from eNBs in different cells (e.g. where PRS signaling is defined by parameters for bandwidth, frequency and other characteristics that do not change) and/or to OTDOA positioning with dynamic adaptation of PRS signaling from one or more eNBs.

Referring to FIG. 3B, system 300B can include one or more network cells (which may correspond to cells of eNBs 202, 205 and 210, eNB 305, etc., or to eNBs 202, 205 and 210 and/or eNB 305 themselves), such as a reference cell 320 and one or more neighboring cells 322. In an example, reference cell 320 and/or neighboring cell(s) 322 or other non-reference cells can transmit signals (e.g. PRS signals) that can be received (e.g. measured) by one or more UEs 302. Reference cell 320 and/or one or more of neighboring cell(s) 322 can be a serving network cell for any UE 302 or a non-serving network cell for any UE 302.

In accordance with one aspect, any UE 302 and/or other entities within system 300B (e.g. location server 310) can determine the position of the UE 302 using OTDOA, wherein timing measurements are made by UE 302 for reference signals (e.g. PRS signals) supported by LTE and/or for other detectable pilot signals, etc., transmitted by reference cell 320 and/or neighboring cell(s) 322. As used generally herein, a "neighboring cell" or "neighbor cell" is used to refer to a cell that is nearby to (including, e.g., adjacent to or separated from but close to) a serving network cell for a given UE 302 or is otherwise nearby the UE 302 (e.g., is transmitted by an eNB that is within a few miles of UE 302). However, other suitable network cells, such as network cells that border a designated reference cell 320, could additionally be utilized as described herein.

As shown in system 300B, a UE 302 can utilize a position fixing module 332 and/or other suitable means to perform position fixing within system 300B. In an example, a UE 302 can utilize positioning assistance data to help determine a position fix, acquire and measure PRS signals more quickly and/or more reliably, reduce complexity of measurements, improve performance of the UE 302, and/or other suitable ends, compared to determining a position fix without positioning assistance data. In some implementations, the positioning assistance data may include information such as: (i) identification of the reference cells 320 and/or neighboring cells 322 (e.g. using global cell identities and/or local physical cell identities); (ii) identification or characterization of PRS signals transmitted by the reference cell 320 and/or neighboring cells 322 (e.g. PRS bandwidth, PRS subframe assignments, PRS encoding); (iii) relative transmit time differences between the PRS signals transmitted by the reference cell 320 and neighboring cells 322; (iv) the approximate RSTD measurement expected (e.g., by location server 310) to be made by UE 302 for each neighboring cell 322; and/or (v) locations of the eNB antennas for the reference cell 320 and/or neighboring cells 322.

As further shown in FIG. 3B, the positioning assistance data can be obtained by a UE 302 from a location server 310 associated with system 300B. The location server 310 can be an E-SMLC, such as E-SMLC 355, an Emergency SUPL Location Platform (E-SLP), an eNB, or any other suitable entity that can provide UE 302 with information to aid in the performance of position fixing module 332. Position fixing module 332 may be used by UE 302 to make measurements of PRS signals transmitted by different reference cells 320 and/or neighboring cells 322 (e.g. make RSTD measurements of the PRS signal transmitted by one reference cell 320 and each of several different neighboring cells 322) with the measurements being returned by UE 302 to location server 310 to enable location server 310 to compute a location estimate for UE 302. Alternatively, position fixing module 332 may be used by UE 302 to make measurements of PRS signals transmitted by different reference cells 320 and/or neighboring cells 322 and to compute a location estimate from these measurements (e.g. using positioning assistance data received from location server 310 to help determine the location estimate).

In an example, location server 310 can include a positioning assistance message generator 312 that can be utilized to generate positioning assistance data for a given UE 302 in various manners. Upon generation of such data, location server 310 can transfer the generated data to the given UE 302 via one or more positioning assistance messages (e.g. LPP or LPP/LPPe positioning assistance messages).

Figure 4:
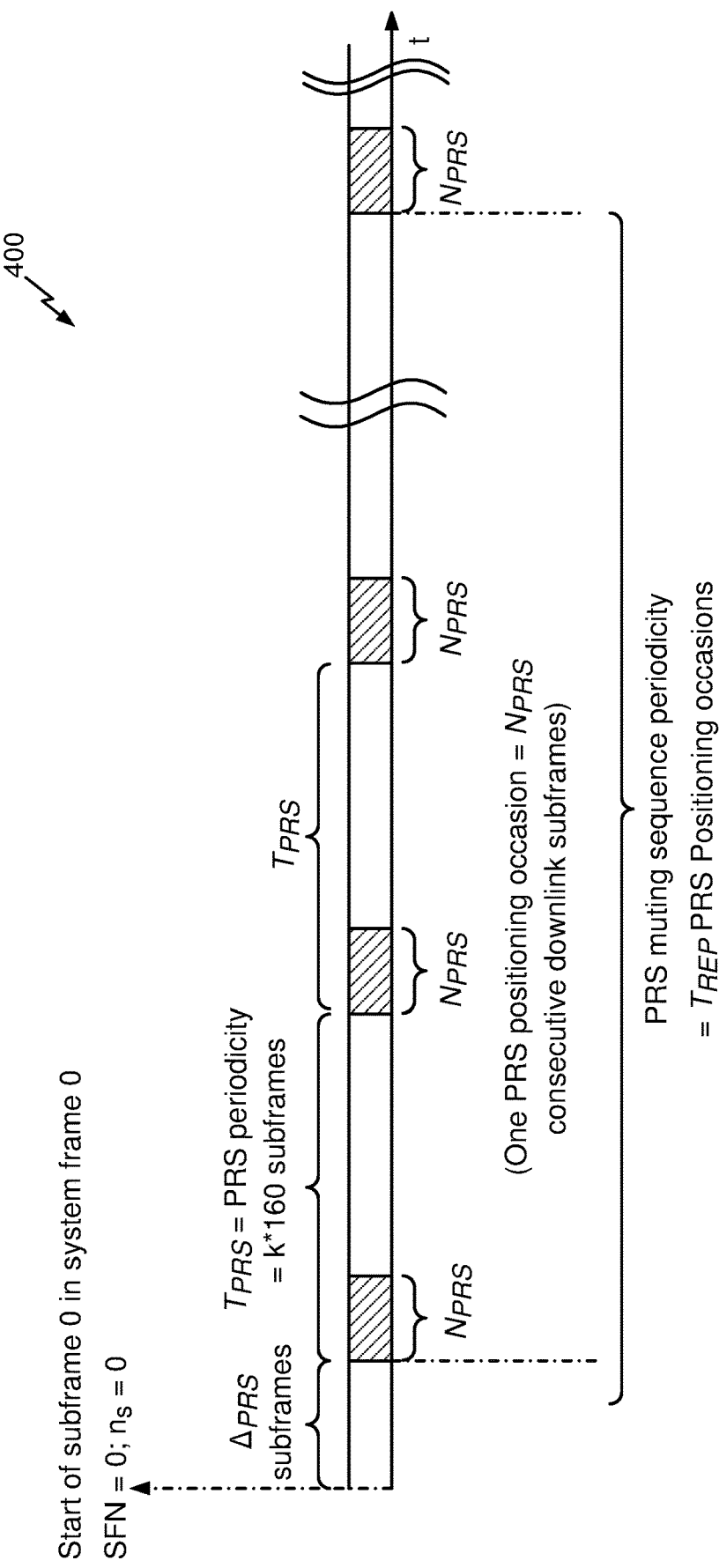
FIG. 4 illustrates a time sequence of an exemplary PRS duty cycle.

FIG. 4 shows a time sequence 400 of an exemplary PRS duty cycle. FIG. 4 illustrates a sequence of LTE subframe transmissions from an eNB (e.g. eNB 305) in a particular cell supported by the eNB starting with transmission at subframe zero in a system frame with system frame number (SFN) zero and extending to transmission from the last subframe of the system frame with SFN equal to 1023 (on the far right in FIG. 4 and not specifically shown in FIG. 4). In LTE in Frequency Division Duplex (FDD) mode, according to 3GPP TSs, each subframe has a duration of one millisecond (ms) and each system frame is composed of 10 subframes and has a duration of 10 ms. System frames can also be referred to as radio frames or simply as frames. Consecutive system frames are numbered from 0 to 1023, after which the numbering restarts again from zero for subsequent system frames. Therefore, FIG. 4 shows transmission over the longest set of subframes that can be individually and distinctly referenced (via subframe and system frame numbering) for LTE. In FIG. 4, increasing time is represented by the horizontal lines going from left to right. Groups of consecutive subframes that are used to transmit PRS, and that are referred to in 3GPP TSs (e.g., in 3GPP TS 36.211 and 36.355) as "PRS positioning occasions", are represented in FIG. 4 by the diagonally striped rectangles.

As defined by 3GPP (e.g., in TS 36.211), the sequence of subframes used to transmit PRS for OTDOA is characterized and defined by a number of parameters comprising: (i) a reserved block of bandwidth (BW); (ii) a configuration index $I_{PRS}$ (which defines both an offset $\Delta_{PRS}$ from the start of subframe zero for SFN zero to the first PRS positioning occasion and a periodicity $T_{PRS}$ in units of subframes for consecutive PRS positioning occasions); (iii) a duration $N_{PRS}$ (defining the number of consecutive PRS subframes in each PRS positioning occasion); (iv) a muting pattern (defining a sequence of consecutive PRS positioning occasions within which the PRS signal is either transmitted or is muted according to the muting pattern); and (v) a muting sequence periodicity $T_{REP}$ which can be implicitly included as part of the muting pattern in (iv). In some cases, with a fairly low PRS duty cycle, $N_{PRS}=1$, $T_{PRS}=160$ subframes (equivalent to 160 ms), and BW=1.4, 3, 5, 10, 15 or 20 MHz. To increase the PRS duty cycle, the NPRS value can be increased to six (i.e., $N_{PRS}=6$) and the BW value can be increased to the LTE system bandwidth (i.e., BW=LTE system bandwidth).

For the case of LTE using Time Division Duplex (TDD), system frames are again each of duration 10 ms and each comprise eight available subframes for uplink or downlink transmission. The PRS parameters described above for FDD are then used to define in which downlink subframes PRS transmission occurs. Specifically, the offset $\Delta_{PRS}$ provides the number of downlink subframes from the first downlink subframe in system frame zero to the first PRS subframe; the duration $N_{PRS}$ provides the number of consecutive downlink PRS subframes in each PRS positioning occasion; and the periodicity $T_{PRS}$ provides the number of downlink subframes between the start of consecutive PRS positioning occasions.

Accordingly, the accuracy of the position fix obtained through LPP with OTDOA is dependent upon the accuracy of RSTD measurements. Further, the accuracy of RSTD measurements is directly correlated with the transmission power and PRS bandwidth of the serving cell and neighbor cells. Based on the assumption that the serving cell is the best cell available, sufficiently accurate RSTD measurements are obtainable if the Reference Signals Received Power (RSRP) from the serving cell is sufficiently high. Table 1 below sets forth example relationships between sensitivity loss, correlation peak width, and the PRS processing bandwidth based on simulation results. As the processing bandwidth is reduced, the number of resource blocks for PRS measurements and, therefore, the PRS (reference signal) CINR decrease as well.

TABLE 1

| | Bandwidth (MHz) | | | | | |
|---|---|---|---|---|---|---|
| | 20 | 15 | 10 | 5 | 3 | 1.4 |
| Number of Resource Blocks | 100 | 75 | 50 | 25 | 15 | 6 |
| Sensitivity Loss (dB) | 0 | −1.25 | −3 | −6 | −8.25 | −12.2 |
| Correlation Peak Width (m) | 33.3 | 44.4 | 66.6 | 133.2 | 222.1 | 555.2 |

Figure 5:
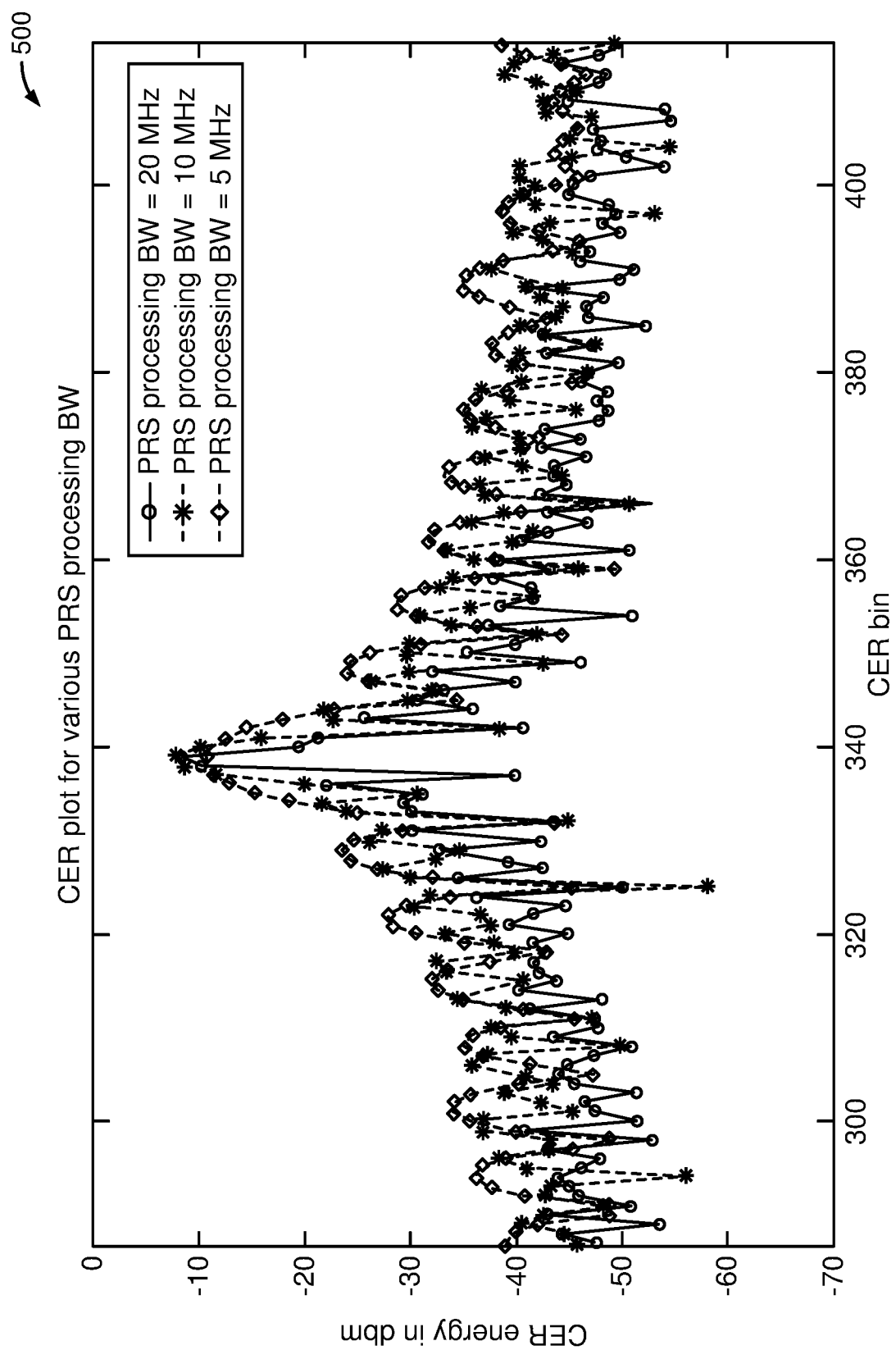
FIG. 5 is a diagram illustrating example Channel Energy Response (CER) peaks associated with decoding a 20 MHz PRS at three different processing bandwidths based on simulation results.

Referring to FIG. 5, a diagram 500 illustrating example Channel Energy Response (CER) peaks associated with decoding a 20 MHz PRS at three different processing bandwidths based on simulation results is shown. As illustrated, the CER peaks are associated with processing bandwidths of 20 MHz, 10 MHz, and 5 MHz, respectively. When the processing bandwidth is narrower than the full bandwidth of the PRS, only the respective central bandwidth portions of the PRS are decoded. For example, the CER peak associated with the 10 MHz processing bandwidth is obtained by decoding only the central 10 MHz of the 20 MHz PRS. Similarly, the CER peak associated with the 5 MHz processing bandwidth is obtained by decoding only the central 5 MHz of the 20 MHz PRS. In other examples, however, the CER peak can be obtained by decoding a non-central bandwidth portion of the PRS. For example, a contiguous upper sideband not including a center frequency (the sideband spanning, for example, 15 MHz, 10 MHz, 5, MHz, 3 MHz, or 1.4 MHz) or a contiguous lower sideband not including a center frequency (the sideband spanning, for example, 15 MHz, 10 MHz, 5, MHz, 3 MHz, or 1.4 MHz) can be decoded.

It should be appreciated that the accuracy of the CER peak position is directly indicative of the accuracy of RSTD measurements. The three CER peaks in FIG. 5 are obtained when Carrier-to-Interference-and-Noise Ratio (CINR) is greater than 10 dB. As can be seen, with the decrease of the processing bandwidth, the CER peak becomes less sharp. However, the CER peak positions remain approximately the same, roughly centered around CER bin 340 in the illustrated example. To be precise, an error of 3 Ts (where T is an LTE parameter for the basic unit of time, equal to approximately 32 nanoseconds) is observed with the Additive White Gaussian Noise (AWGN) channel condition as the processing bandwidth is reduced from 20 MHz to 5 MHz. In other words, the difference in RSTD measurement accuracy is negligible as the processing bandwidth is reduced from 20 MHz to 10 MHz or even 5 MHz. This is because the processing gain achieved at broader processing bandwidths through coherent combining has diminishing returns.

Therefore, in one embodiment, the processing bandwidth of the PRS may be reduced, as long as the CINR is above a threshold, for example, an upper threshold. It is understood that while the discussion above has been primarily with reference to PRS, the teachings of FIGS. 1-5 above are applicable to other reference signals, including those described below with reference to FIG. 6.

Figure 6:
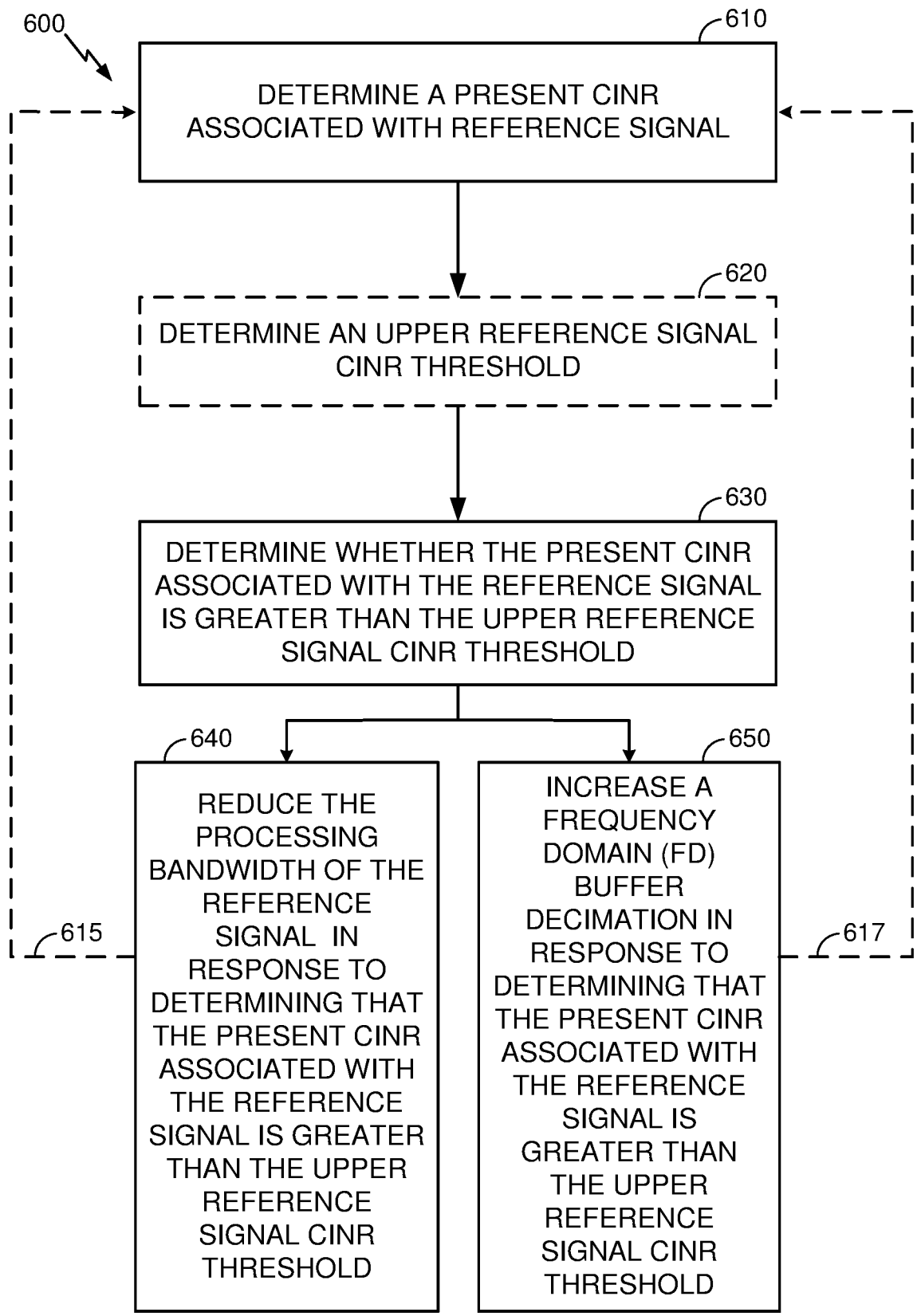
FIG. 6 is a flowchart illustrating an example method for adjusting a processing bandwidth of PRS, according to one embodiment of the disclosure.

Referring to FIG. 6, a flowchart illustrating an example method 600 for adjusting a processing bandwidth or a frequency domain (FD) buffer decimation associated with a reference signal, according to one embodiment of the disclosure, is shown. Method 600 can be performed, for example, by a UE in communication with an LTE network. In one embodiment, the operations associated with the method 600 may be started when the reference signal is processed at full bandwidth. The reference signal can include PRS (as discussed above) or cell-specific reference signals (CRS). Other examples of the reference signal include primary synchronization signal (PSS), secondary synchronization signal (SSS), physical broadcast channel (PBCH) signal, channel state indicator reference signal (CSI-RS), demodulation reference signal (DM-RS), UE-specific reference signal (UE-RS), and multicast-broadcast single-frequency network (MBSFN) reference signal (MB-SFN-RS). Other reference signals as defined in various wireless communications standards may also be used, including those disclosed elsewhere herein. Additionally or alternatively, as used herein, reference signals can also include synchronization signals as defined in various wireless communications standards, including those disclosed elsewhere herein.

At block 610, a present CINR associated with the reference signal may be determined. In one example, block 610 may be performed for a first time, however, in another example, where method 600 has already iterated one or more times as (suggested by dashed arrows 615 and 617), block 610 may have been performed i−1 times before, and a current $i^{th}$ iteration includes performing block 610 an $i^{th}$ time. As such, it is understood that at block 610, the CINR associated with the reference signal will be determined for a present processing bandwidth and/or present frequency (FD) buffer decimation. In such a case, it is understood that the present processing bandwidth (or present decimation FD buffer decimation) of block 610 for iteration i may correspond to the reduced processing bandwidth of block 640 (or to the increased FD buffer decimation of block 650) associated with iteration i−1. At optional block 620, optionally, an upper reference signal CINR threshold may be determined. In one embodiment, for example where the reference signal is a PRS, the upper reference signal CINR threshold may be determined based on an $N_{PRS}$ parameter and/or the present PRS processing bandwidth. For example, a reduced bandwidth target CINR value associated with a processing bandwidth that is reduced from a present processing bandwidth can be determined. Using this reduced bandwidth target CINR value, an estimate of an improved CINR at the present processing bandwidth based on the effect of a predicted SNR improvement (where the SNR improvement is based, for example, on correlation gain) and/or other parameter improvement (for example, Received Signal Strength Indicator (RSSI) improvement, Reference Signal Received Power (RSRP) improvement, and Reference Signal Received Quality (RSRQ) improvement) on CINR at the present processing bandwidth over the reduced bandwidth target CINR can be computed. This computed estimated improved CINR over the reduced bandwidth target CINR can be used as the upper reference signal CINR threshold. In such a case, this upper reference signal CINR threshold represents a value the current reference signal CINR at the present processing bandwidth would have to exceed in order for an expected CINR resulting from reducing the processing bandwidth from the present processing bandwidth would still be equal to or greater than the reduced bandwidth target CINR value. In various examples, even where the upper reference signal CINR threshold is dependent upon the present processing bandwidth, the upper reference signal CINR threshold can be either determined from a look up table and/or dynamically determined.

In one specific example, presume that the present processing bandwidth is 20 MHz, and it is to be determined whether to reduce the processing bandwidth to 10 MHz. Hence, a reduced bandwidth target CINR is to be determined. In one example, the reduced bandwidth target CINR can be a detection threshold at the reduced bandwidth, in this example, 10 MHz. This detection threshold can be determined, for example, by a look-up table. Factors that can affect the detection threshold include edge-to-edge bandwidth, level of decimation of frequency bins, number of subframes used for integration, and type of integration used (for example, coherent integration, non-coherent integration, etc.). One way of predicting SNR loss is by taking the ratio between the number of REs at the present processing bandwidth and at the proposed reduced bandwidth. Suppose it is estimated that SNR will degrade by approximately 3 dB by reducing the processing bandwidth from 20 MHz to 10 MHz. As such, the upper reference signal CINR threshold can then be equal to the reduced bandwidth target CINR, in this example the 10 MHz detection threshold, plus 3 dB. More generally, in this example, the upper reference signal CINR threshold can be determined by the equation given below relating the upper reference signal CINR threshold, $T_{CINR}$, to the detection threshold at reduced processing bandwidth, $T_{detect@redBW}$, and predicted SNR loss due to processing bandwidth reduction, $\Delta_{SNR}$.

$$T_{CINR} = T_{detect@redBW} + \Delta_{SNR}.$$

While the upper reference signal CINR threshold is discussed above relative to reducing the processing bandwidth, it is understood that a similar upper reference signal CINR threshold can be computed for increasing a FD buffer decimation. For example, based on an increased decimation target CINR value similar to the reduced bandwidth target CINR value described above, an estimate of an improved CINR at the present FD buffer decimation can be computed, where the estimated improved CINR represents a prediction of how much improvement to the CINR could be expected by reducing the FD buffer decimation from the increased FD buffer decimation to the present FD buffer decimation. In a manner similar to that described above, the ratio between the number of REs at a present FD buffer decimation and at the proposed increased FD buffer decimation can be used to predict an SNR improvement over an increased decimation target CINR. It is understood that in some examples, determining whether to reduce processing bandwidth may be associated with an upper reference signal CINR threshold that is different from an upper reference signal CINR threshold associated with determining whether to increase FD buffer decimation.

At block 630, whether the present CINR associated with the reference signal is greater than the upper reference signal CINR threshold may be determined. If the present CINR is not greater than the upper reference signal CINR threshold, the processing bandwidth can be maintained at the present level and should not be reduced (or FD buffer decimation should not be increased). At block 640, the processing bandwidth of the reference signal may be reduced in response to determining that the present CINR associated with the reference signal is greater than the upper reference signal CINR threshold. As used herein, processing bandwidth can refer to a bandwidth that is to be processed such that reducing the processing bandwidth would reduce the power used when performing signal processing calculations by, for example, a modem processor associated with a WWAN transceiver or other radio frequency (RF) transceiver, which can, for example, be part of a communications subsystem 730. The modem processor could be, for example, dedicated hardware or a digital signal processor (DSP). For example, if 20 MHz is to be processed, presume that there are 100 resource blocks (RBs) and a total of 1600 individual resource elements (REs). The correlation operation portion of processing at 20 MHz bandwidth alone may entail 1600 complex multiply-accumulate (MAC) operations. Reducing the bandwidth to 10 MHz, for example, reduces the number of RBs to 50 and the number of REs to 800, thereby reducing the number of MACs to half the number of MACs involved at 20 MHz. This can reduce the amount of power involved in performing the signal processing. The processing bandwidth associated with the reference signal can be one of 20 MHz, 15 MHz, 10 MHz, 5 MHz, 3 MHz, or 1.4 MHz, and hence reducing the processing bandwidth associated with the reference signal can include reducing the processing bandwidth associated with the reference signal from one of these values to a lower of these values.

At block 650, which may be performed additionally or alternatively to block 640, a frequency domain (FD) buffer decimation may be increased in response to determining that the present CINR associated with the reference signal is greater than the upper reference signal CINR threshold. For example, the FD buffer can be decimated by keeping or sampling, for example, every other frequency bin, every third frequency bin, every fourth frequency bin, etc. In one example, the FD buffer decimation associated with the reference signal is a decimation of sub-carriers of an Orthogonal Frequency Division Multiplexing (OFDM) signal by an integer factor, for example, m, that is keep every mth bin. Hence, in one example, increasing the FD buffer decimation can correspond to increasing the integer factor, m. When the method 600 is run a first time, the decimation may be zero (no decimation is performed), and hence increasing a FD buffer decimation can include increasing the decimation to, for example, a decimation such that every other frequency bin is kept or sampled. However, if method 600 has been performed at least once before, the FD buffer decimation may already have a non-zero decimation that is then further increased. Similar to reducing the processing bandwidth of block 640, decimation of the frequency bins can also reduce the processing power used when processing the PRS signal. Comparing the procedure of blocks 640 and 650, it can be said that reducing the processing bandwidth can maintain good accuracy for time-of-arrival computations, as illustrated in FIG. 5 (with reference to processing bandwidth reduction), but may have reduced ability to identify or reject multipath contributions. Decimation retains the wider bandwidth characteristics of the signal which allows better identification or rejection of multipath contributions but can suffer from time-of-arrival ambiguities. To exploit the advantages of both approaches while also mitigating inaccuracies in measurements, one may alternate between reduced processing bandwidth and decimation when performing PRS measurements.

In one embodiment, the operations associated with blocks 610 through 640 and 650 may be repeated until it is determined at block 630 that the present CINR associated with the reference signal is not greater than the upper reference signal CINR threshold. Once the present CINR of the reference signal is no longer greater than the upper reference signal CINR threshold, iteration stops, and the processing bandwidth is not further reduced (or the FD buffer decimation is not increased). Also, in one embodiment, it is understood that on different iterations of method 600, block 640 may be performed while in other iterations, block 650 may be performed. Hence, in some situations, the processing bandwidth associated with the reference signal is reduced at least once and the FD buffer decimation associated with the reference signal is increased at least once. Although, it is understood, that in other scenarios only block 640, or only block 650, may be performed in one or more iterations. Although not explicitly described in FIG. 6, it is understood that the method 600 can further include processing the reference signal, for example PRS, at the processing bandwidth and/or the FD buffer decimation to obtain RSTD measurements and determining a location of the UE with OTDOA positioning based on the RSTD measurements, as described elsewhere with reference to FIGS. 3A, 3B, 4, and 5.

It is understood that the discussion above related primarily to the question of whether processing bandwidth could be further reduced (or FD buffer could be further decimated) with tolerable loss to accuracy in timing measurements for PRS. As such, a present CINR can be compared to an upper reference signal CINR threshold. However, it is understood that, additionally or alternatively, the present CINR can also be compared to a lower reference signal CINR threshold. In one example, while the upper reference signal CINR threshold is associated with a reduced processing bandwidth (or increased FD buffer decimation), the lower reference signal CINR threshold can be associated with a present bandwidth (or FD buffer decimation). In one example, the lower reference signal CINR threshold can represent a detection threshold at the present processing bandwidth (or FD buffer decimation). If the present reference signal CINR is below the lower reference signal CINR threshold, the processing bandwidth can be increase (or FD buffer decimation reduced). Processing bandwidth reductions or increases (or FD buffer decimation increases or reductions) need not reduce or increase by the next possible value but may skip values. Hence, for example, if a CINR is 11.5 dB at a 10 MHz processing bandwidth, with an expected improvement to 13.5 dB at 15 MHz, where the 13.5 dB remains below the detection threshold for 15 MHz, the processing bandwidth may be increased directly to 20 MHz (thereby skipping the 15 MHz value). Means for performing the functionalities described with reference to blocks 610, 620, 630, 640, and/or 650 above may, but necessarily, include, for example processor(s) 710, storage device(s) 725, communications subsystem 730, and/or memory 735 with reference to FIG. 7.

Figure 7:
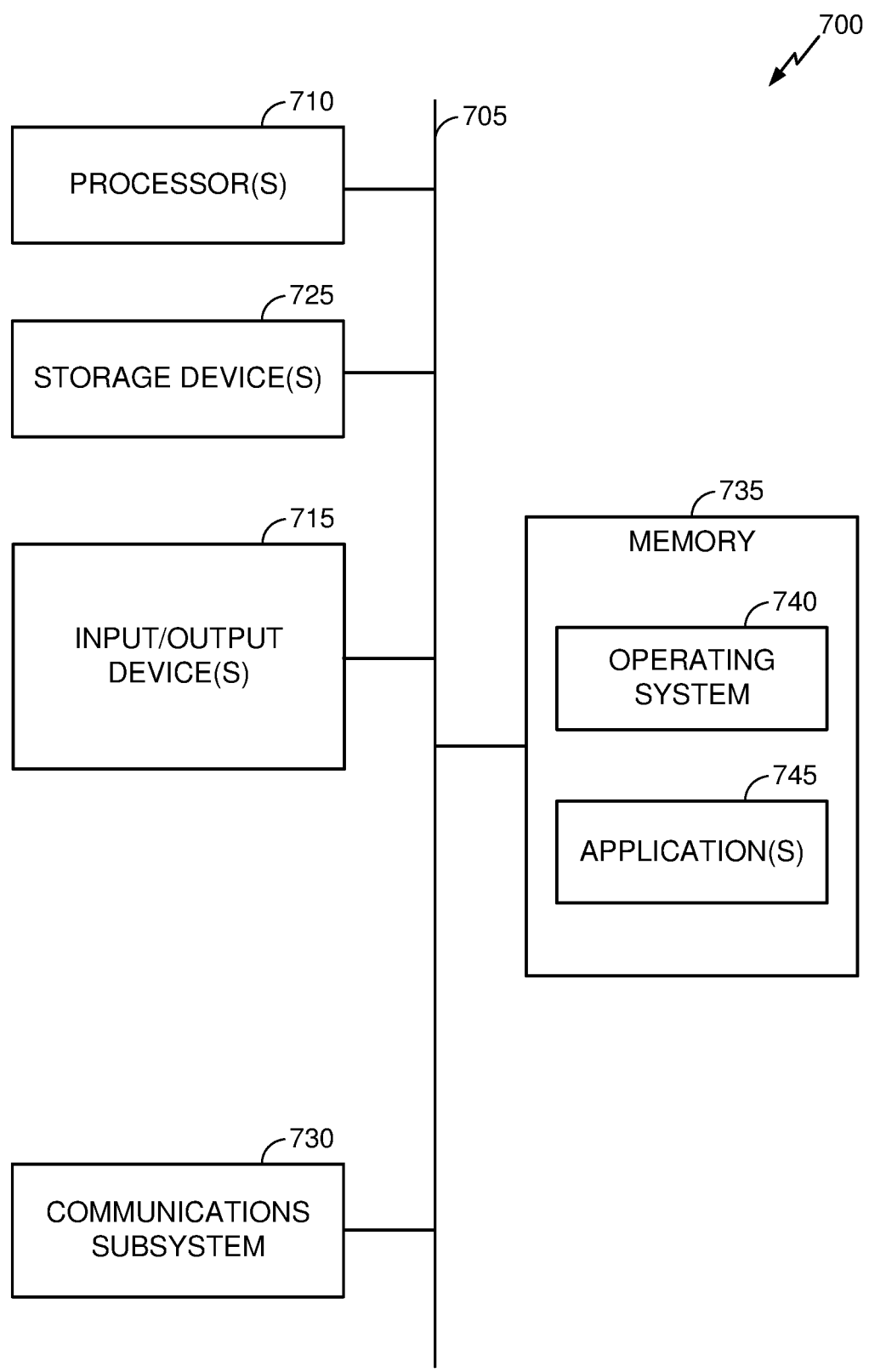
FIG. 7 is a block diagram illustrating an example device according to one embodiment of the disclosure.

Referring to FIG. 7, a block diagram illustrating an example device 700 according to one embodiment of the disclosure, is shown. For example, device 700 can comprise an apparatus configured to adjust a processing bandwidth or a frequency domain (FD) buffer decimation associated with a reference signal. The device 700 is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, and/or the like); one or more input/output devices 715 comprising a mouse, a keyboard, a display, a speaker, sensors, and/or the like.

The device 700 may further include (and/or be in communication with) one or more non-transitory storage devices 725, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including without limitation, various file systems, database structures, and/or the like.

The device 700 might also include a communications subsystem 730, which can include without limitation a modem, a network card (wireless or wired), an infrared communication device, a wireless communication device, chipset, and/or modem (such as a Bluetooth device, an 802.11 device, a Wi-Fi device, a WiMAX device, cellular communication modems/facilities, etc.), and/or the like. The communications subsystem 730 may permit data to be exchanged with a network, other computer systems/devices, and/or any other devices described herein. In many embodiments, the device 700 will further comprise a working memory 735, which can include a random access memory (RAM) or read-only (ROM) device, as described above.

The device 700 also can comprise software elements, shown as being currently located within the working memory 735, including an operating system 740, device drivers, executable libraries, and/or other code, such as one or more application programs 745, which may comprise or may be designed to implement methods, and/or configure systems, provided by other embodiments, as described herein. Hence, the device 700 can include the memory (for example, storage devices 725 and/or working memory 735) and the processor 710 coupled to the memory by, for example, bus 705, where the processor 710 is configured to perform any of the functionality described herein with particular reference to FIG. 6. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 725 described above. In some cases, the storage medium might be incorporated within a computer device, such as the device 700. In other embodiments, the storage medium might be separate from a computer device (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the device 700 and/or might take the form of source and/or installable code, which, upon compilation and/or installation on the device 700 (e.g., using any of a variety of generally available compilers, installation programs, compression/decompression utilities, etc.), then takes the form of executable code. The non-transitory computer-readable medium can comprise code which, when executed by one or more processors, instructs the one or more processors to perform a procedure implemented at a User Equipment (UE), such as UE 1, UE 2, UE 3, UE 4, UE 5, UE 250, UE 252, UE 254, UE 302, and/or device 700, for adjusting a processing bandwidth (or FD buffer decimation) associated with a reference signal, for example, PRS. The procedure can include any of the methods described herein, for example, method 600 with reference to FIG. 6.

The device 700 may be a: mobile device, wireless device, cell phone, personal digital assistant, wearable device (for example, eyeglasses, watch, head wear, or similar bodily attached device), mobile computer, tablet, personal computer, laptop computer, data processing device/system, server, or any type of device that has processing and/or displaying capabilities. The device 700 may correspond to UE 302 in FIGS. 3A and 3B.

It should be appreciated that application or system that completes the relevant operations may be implemented as software, firmware, hardware, combinations thereof, etc. In one embodiment, the previous described functions may be implemented by one or more processors (e.g., processor 710) of a device 700 to achieve the previously desired functions (e.g., the method operations of FIG. 6).

Therefore, based on embodiments of the disclosure, in one example, the processing bandwidth of PRS may be reduced based on a determination that the present reference signal CINR is greater than a an upper reference signal CINR threshold without sacrificing OTDOA positioning accuracy. Low-power low-bandwidth devices, such as NarrowBand Internet of Things (IoT) (NBIoT) devices with a 200 kHz bandwidth, or LTE Cat-M devices with a 1.4 MHz bandwidth, etc., may particularly benefit from embodiments of the disclosure, because narrower PRS processing bandwidths lead to lower power consumption.

Example methods, apparatuses, or articles of manufacture presented herein may be implemented, in whole or in part, for use in or with mobile communication devices. As used herein, "mobile device," "mobile communication device," "hand-held device," "tablets," etc., or the plural form of such terms may be used interchangeably and may refer to any kind of special purpose computing platform or device that may communicate through wireless transmission or receipt of information over suitable communications networks according to one or more communication protocols, and that may from time to time have a position or location that changes. As a way of illustration, special purpose mobile communication devices, may include, for example, cellular telephones, satellite telephones, smart telephones, heat map or radio map generation tools or devices, observed signal parameter generation tools or devices, personal digital assistants (PDAs), laptop computers, personal entertainment systems, e-book readers, tablet PCs, personal audio or video devices, personal navigation units, wearable devices, or the like. It should be appreciated, however, that these are merely illustrative examples relating to mobile devices that may be utilized to facilitate or support one or more processes or operations described herein.

The methodologies described herein may be implemented in different ways and with different configurations depending upon the particular application. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

The herein described storage media may comprise primary, secondary, and/or tertiary storage media. Primary storage media may include memory such as random access memory and/or read-only memory, for example. Secondary storage media may include mass storage such as a magnetic or solid-state hard drive. Tertiary storage media may include removable storage media such as a magnetic or optical disk, a magnetic tape, a solid-state storage device, etc. In certain implementations, the storage media or portions thereof may be operatively receptive of, or otherwise configurable to couple to, other components of a computing platform, such as a processor.

In at least some implementations, one or more portions of the herein described storage media may store signals representative of data and/or information as expressed by a particular state of the storage media. For example, an electronic signal representative of data and/or information may be "stored" in a portion of the storage media (e.g., memory) by affecting or changing the state of such portions of the storage media to represent data and/or information as binary information (e.g., ones and zeros). As such, in a particular implementation, such a change of state of the portion of the storage media to store a signal representative of data and/or information constitutes a transformation of storage media to a different state or thing.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels.

Unless specifically stated otherwise, as apparent from the following discussion, it is appreciated that throughout this specification discussions utilizing terms such as "processing," "computing," "calculating," "identifying", "determining", "establishing", "obtaining", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general-purpose computer once it is programmed to perform particular functions pursuant to instructions from program software.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in some implementations" or other like phrases in various places throughout this specification are not necessarily all referring to the same feature, example, and/or limitation. Furthermore, the particular features, structures, or characteristics may be combined in one or more examples and/or features.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method implemented at a user equipment (UE) for adjusting a frequency domain (FD) buffer decimation of a reference signal, the method comprising:
   determining a present Carrier-to-Interference-and-Noise Ratio (CINR) associated with the reference signal;
   determining whether the present CINR associated with the reference signal is greater than an upper reference signal CINR threshold; and
   increasing the FD buffer decimation of the reference signal, in response to determining that the present CINR associated with the reference signal is greater than the upper reference signal CINR threshold.

2. The method of claim 1, further comprising reducing a processing bandwidth associated with the reference signal from a full bandwidth in response to the determining that the present CINR associated with the reference signal is greater than the upper reference signal CINR threshold.

3. The method of claim 1, further comprising reducing a processing bandwidth associated with the reference signal in response to the determining that the present CINR associated with the reference signal is greater than the upper reference signal CINR threshold, wherein the reducing the processing bandwidth comprises decoding a central bandwidth portion of the reference signal.

4. The method of claim 1, wherein the reference signal is a positioning reference signal (PRS) and further comprising:
   determining the upper reference signal CINR threshold based on one or both of: a present processing bandwidth associated with the PRS, or an NPRS parameter indicative of a number of consecutive PRS subframes in each PRS positioning occasion.

5. The method of claim 1, wherein the FD buffer decimation of the reference signal is a decimation of sub-carriers of an Orthogonal Frequency Division Multiplexing (OFDM) signal by an integer factor.

6. The method of claim 1, further comprising:
   processing the reference signal at the FD buffer decimation to obtain reference signal time difference (RSTD) measurements; and
   determining a location of the UE with Observed Time Difference of Arrival (OTDOA) positioning based on the RSTD measurements.

7. The method of claim 1, wherein a processing bandwidth associated with the reference signal is reduced at least once and the FD buffer decimation of the reference signal is increased at least once.

8. The method of claim 1, wherein the UE is in communication with a Long-Term Evolution (LTE) network.

9. An apparatus configured to adjust a frequency domain (FD) buffer decimation of a reference signal, the apparatus comprising:
   a memory; and
   a processor coupled to the memory, the processor configured to:
      determine a present Carrier-to-Interference-and-Noise Ratio (CINR) associated with the reference signal;
      determine whether the present CINR associated with the reference signal is greater than an upper reference signal CINR threshold; and
      increase the FD buffer decimation of the reference signal, in response to determining that the present CINR associated with the reference signal is greater than the upper reference signal CINR threshold.

10. The apparatus of claim 9, wherein the processor is further configured to reduce a processing bandwidth associated with the reference signal from a full bandwidth in response to the determining that the present CINR associated with the reference signal is greater than the upper reference signal CINR threshold.

11. The apparatus of claim 9, wherein the processor is further configured to reduce a processing bandwidth associated with the reference signal bandwidth in response to the determining that the present CINR associated with the reference signal is greater than the upper reference signal CINR threshold, wherein reducing the processing bandwidth associated with the reference signal comprises the processor configured to decode a central bandwidth portion of the reference signal.

12. The apparatus of claim 9, wherein the reference signal is a positioning reference signal (PRS), and wherein the processor is further configured to determine the upper reference signal CINR threshold based on one or both of: a present processing bandwidth associated with the PRS, or an NPRS parameter indicative of a number of consecutive PRS subframes in each PRS positioning occasion.

13. The apparatus of claim 9, wherein the FD buffer decimation is a decimation of sub-carriers of an Orthogonal Frequency Division Multiplexing (OFDM) signal by an integer factor.

14. The apparatus of claim 9, wherein the reference signal is a positioning reference signal (PRS), and wherein the processor is further configured to:
process the PRS at the FD buffer decimation to obtain reference signal time difference (RSTD) measurements; and
determine a location of the apparatus with Observed Time Difference of Arrival (OTDOA) positioning based on the RSTD measurements.

15. The apparatus of claim 9, wherein the processor is further configured to reduce a processing bandwidth associated with the reference signal at least once and increase the FD buffer decimation of the reference signal at least once.

16. The apparatus of claim 9, wherein the apparatus is in communication with a Long-Term Evolution (LTE) network.

17. An apparatus for adjusting a frequency domain (FD) buffer decimation of a reference signal, the apparatus comprising:
means for determining a present Carrier-to-Interference-and-Noise Ratio (CINR) associated with the reference signal;
means for determining whether the present CINR associated with the reference signal is greater than an upper reference signal CINR threshold; and
means for increasing the FD buffer decimation of the reference signal, in response to determining that the present CINR associated with the reference signal is greater than the upper reference signal CINR threshold.

18. The apparatus of claim 17, further comprising means for reducing a processing bandwidth associated with the reference signal from a full bandwidth in response to the determining that the present CINR associated with the reference signal is greater than the upper reference signal CINR threshold.

19. The apparatus of claim 17, further comprising means for reducing a processing bandwidth associated with the reference signal in response to the determining that the present CINR associated with the reference signal is greater than the upper reference signal CINR threshold, wherein the means for reducing the processing bandwidth associated with the reference signal comprises means for decoding a central bandwidth portion of the reference signal.

20. The apparatus of claim 17, wherein the reference signal is a positioning reference signal (PRS) and further comprising:
means for determining the upper reference signal CINR threshold based on one or both of: a present processing bandwidth associated with the PRS, or an NPRS parameter indicative of a number of consecutive PRS subframes in each PRS positioning occasion.

21. The apparatus of claim 17, wherein the FD buffer decimation is a decimation of sub-carriers of an Orthogonal Frequency Division Multiplexing (OFDM) signal by an integer factor.

22. The apparatus of claim 17, further comprising:
means for processing the reference signal at the FD buffer decimation to obtain reference signal time difference (RSTD) measurements; and
means for determining a location of the apparatus with Observed Time Difference of Arrival (OTDOA) positioning based on the RSTD measurements.

23. The apparatus of claim 17, wherein a processing bandwidth associated with the reference signal is reduced at least once and the FD buffer decimation of the reference signal is increased at least once.

24. A non-transitory computer-readable medium comprising code which, when executed by a processor, instructs the processor to perform a procedure implemented at a User Equipment (UE) for adjusting a frequency domain (FD) buffer decimation of a reference signal, the procedure comprising:
determining a present Carrier-to-Interference-and-Noise Ratio (CINR) associated with the reference signal;
determining whether the present CINR associated with the reference signal is greater than an upper reference signal CINR threshold; and
increasing the FD buffer decimation of the reference signal, in response to determining that the present CINR associated with the reference signal is greater than the upper reference signal CINR threshold.

25. The non-transitory computer-readable medium of claim 24, wherein the procedure further comprises reducing a processing bandwidth associated with the reference signal from a full bandwidth in response to the determining that the present CINR associated with the reference signal is greater than the upper reference signal CINR threshold.

26. The non-transitory computer-readable medium of claim 24, wherein the procedure further comprises reducing a processing bandwidth associated with the reference signal in response to the determining that the present CINR associated with the reference signal is greater than the upper reference signal CINR threshold, and wherein the procedure comprising reducing the processing bandwidth comprises a procedure comprising decoding a central bandwidth portion of the reference signal.

27. The non-transitory computer-readable medium of claim 24, wherein the reference signal is a positioning reference signal (PRS) and wherein the procedure further comprises determining the reference signal CINR threshold based on one or both of: a present processing bandwidth associated with the PRS, or an NPRS parameter indicative of a number of consecutive PRS subframes in each PRS positioning occasion.

28. The non-transitory computer-readable medium of claim 24, wherein the procedure further comprises:
processing the reference signal at the FD buffer decimation to obtain reference signal time difference (RSTD) measurements; and
determining a location of the UE with Observed Time Difference of Arrival (OTDOA) positioning based on the RSTD measurements.

29. The non-transitory computer-readable medium of claim 24, wherein the FD buffer decimation is a decimation of sub-carriers of an Orthogonal Frequency Division Multiplexing (OFDM) signal by an integer factor.

* * * * *